METHOD OF ORIENTING THE EASY AXIS OF THIN FERROMAGNETIC FILMS

Filed Oct. 30, 1964

INVENTORS
ALBERT I. SCHINDLER
CONRAD M. WILLIAMS

BY Walter M. O'Brien
R. I. Sciascia ATTORNEYS

United States Patent Office 3,472,708

Patented Oct. 14, 1969

3,472,708

METHOD OF ORIENTING THE EASY AXIS OF THIN FERROMAGNETIC FILMS

Albert I. Schindler, Silver Spring, Md., and Conrad M. Williams, Washington, D.C., assignors to the United States of America as represented by the Secretary of the Navy Filed Oct. 30, 1964, Ser. No. 407,937
Int. Cl. H01f *10/02;* C21d *9/46;* C22c *39/38*
U.S. Cl. 148—108 1 Claim

ABSTRACT OF THE DISCLOSURE

Thin ferromagnetic films of increased uniaxial anisotropy energy and enhanced orientation of the preferred or easy axis of magnetization of the films are obtained by subjecting the films to irradiation with charged particles while in the presence of a saturating magnetic field and at a film temperature of from about 15 to 200° C. which, optimally, is below 100° C. The treatment is also effective to reduce the coercive force for the films.

Figure 1A:
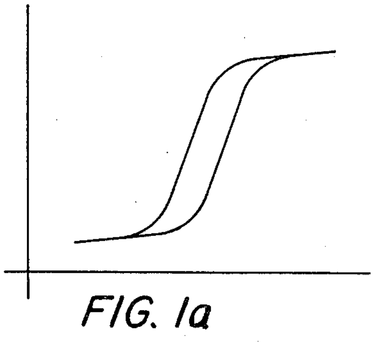

The invention described herein may be manufactured and used by or for the Government of the United States of America for governmental purposes without the payment of any royalties thereon or therefor.

This invention relates to thin ferromagnetic films, more particularly to a method of treating thin ferromagnetic films to increase the uniaxial anisotropy energy and orient the easy axis of magnetization.

Thin ferromagnetic films with bistable states of magnetization are of great interest to the computor industry as memory storage devices for digital computors. The advantages of such films over the ferrite cores which are presently in use as memory storage devices are an extremely fast switching time, smaller drive currents required, lower eddy current losses, compactness and, due to the compactness of the circuit, shorter electrical leads with resulting lower circuit impedence.

For a ferromagnetic film to have bistable positions for its magnetization vector, it is necessary that the film possess a single preferred axis of magnetization, usually referred to as the easy axis of magnetization, which is the direction in the plane of the film in which the film can be magnetized with the least requirement of energy. This unique property of ferromagnetic films can be also described in terms of the uniaxial anisotropy energy, $E_u = K_u \sin 2\theta$, where $K_u$ is the uniaxial anisotropy energy constant of the film and $\theta$ is the angle between the easy axis and the direction of magnetization of the film. The larger the value of the uniaxial anisotropy energy, the more pronounced is the easy axis of magnetization of the film.

A thin ferromagnetic film contains a number of individual atom groupings known as domains. Each of the domains has an easy axis of magnetization. Collectively, these easy axes constitute the single preferred or easy axis of magetization of the film and if in axial parallelism would provide a film having the largest uniaxial anisotropy energy. However, they are axially dispersed, and, resultantly, the film has a lower effective uniaxial anisotropy energy.

It is an object of the present invention to provide a method for treating thin ferromagnetic films to increase the uniaxial anisotropy energy of the films and to decrease the dispersion of the easy axis of magnetization of the same.

The above and other objects of the invention are accomplished by the practise of the method of our invention in which thin ferromagnetic films are subjected to irradiation with charged particles while in the presence of a saturating magnetic field applied along the desired easy direction of magnetization and at a film temperature in the range of from about 15 to 200° C. which, optimally, is below 100° C.

In the practise of the method of the invention, the thin ferromagnetic film on a smooth substrate surface, which may be of glass, quartz, metal or other solid material, is mounted for exposure to the flux of charged particles. Where the charged particles are $He^3$ particles, the holder is suitably the metal blank-off flange on the vacuum tube which conducts the beam of $He^3$ particles from a Van der Graff accelerator. Means are provided for holding the film at temperature, such as a stream of cooling air flowed over the film and substrate. A saturating magnetic field is applied to the film along the desired easy axis of magnetization during the irradiation by means of a pair of Hemholtz coils between which the film is located.

The total integrated flux applied to the film should be of an order of magnitude sufficient to effect a reordering of atoms of the film which results in an increase in the uniaxial anisotropy energy and thereby an orienting of the easy axis parallel to the magnetic field applied during the irradiation. This total integrated flux may be from about $10^{14}$ to $10^{17}$ particles/cm.$^2$. The energy level of the charged particles should be high enough to cause the particles to penetrate through the film. In addition to $He^3$ particles, suitable charged particles may be protons, electrons and alpha particles.

Thin ferromagnetic films which may be treated by the method of the invention for increase in the uniaxial anisotropy energy and orienting of the domain axes may have a thickness of the order of from about 1,000 to 10,000 angstroms and be prepared on the smooth substrate surface in any suitable way, for example, by electrodeposition or by the known high vacuum evaporation-deposition process. In the case of alloy films, it is preferred to use films which have been prepared by a high vacuum evaporation-deposition process in which the ratios of the metal components of the alloy film are controlled by evaporation of the source alloy at a predetermined fixed rate and deposition of the metal vapors at normal incidence to the substrate which is heated to controlled predetermined temperature. The evaporation and deposition is conducted in a vacuum of $10^{-7}$ to $10^{-5}$ torr. or higher.

The method of the invention is applicable for the modification of various thin ferromagnetic films to impart to the films remarkably constant values of magnetic anisotropy energy, hence constant values of the switching field, and decreased values for the coercive force. Among the high permeability thin metal films which may be treated by the method of the invention are for example, those of iron, nickel, nickel-iron alloys, e.g., 40–95% nickel to 5–60% iron, cobalt-iron alloys, e.g. 50 to 90% cobalt to 10 to 50% iron, cobalt-nickel-iron alloys.

The alloys may contain a total of up to about 10% by weight of one or more elements which increase the magnetic permeability of the alloy, such as copper, manganese, molybdenum and silicon. Among such alloys are, for example, those of the following composition by weight: 50 Ni-50 Fe; 65 Ni-35 Fe; 45 Ni-25 Co-30 Fe; 79 Ni-17 Fe-4 Mo; 78 Ni-15 Fe-5 Cu-2 Cr; 65 Ni-25 Fe-10 Mn and 43 Ni-54 Fe-3 Si, etc.

The invention is illustrated by the application of the method to pairs of thin films of a nickel-iron alloy containing 72% nickel and 28% iron which were deposited on a smooth quartz substrate by the aforedescribed preferred vacuum evaporation-deposition process. The nickel-iron alloy films had a thickness of 6,000 and 5,700 angstroms respectively. The film and substrate were in each case mounted on the metal blank-off flange of a Van der Graff accelerator and between a pair of Hemholtz coils. In each instance a magnetic field of 110 oersteds was applied parallel to the easy axis of magnetization of the film and the films irradiated with a total integrated flux of $8.9 \times 10^{16}$ $He^3$ particles/cm.$^2$. During the irradiation, the temperature of the films was maintained at ambient temperature and never exceeded 38° C.

Figure 1B:
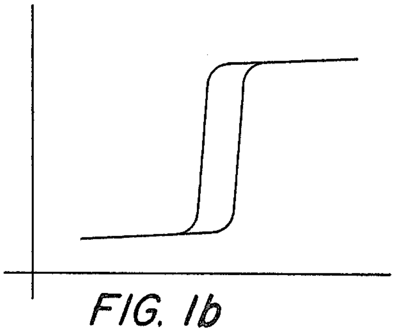
Figure 1C:
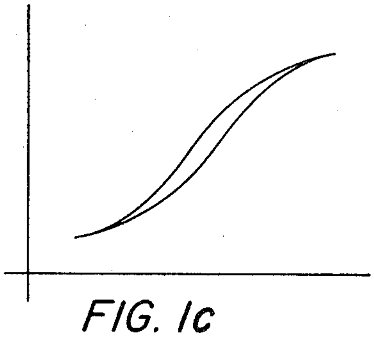
Figure 1D:
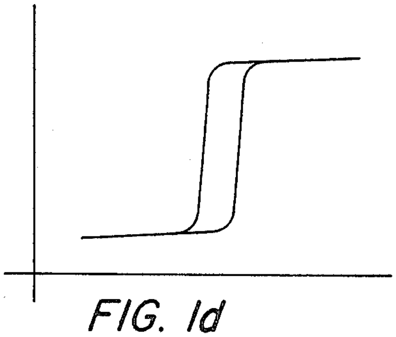

The character of the pre- and post-irradiation hysteresis loops exhibited by the nickel-iron alloy films treated by the method of the invention is illustrated in FIGS. 1*a*, 1*b*, 1*c* and 1*d* of the accompanying drawing. The hysteresis loops as shown are for the nickel-iron alloy film of 5,700 angstroms thickness. The pre-irradiation loops are indicated at FIG. 1*a* and FIG. 1*b* and the post-irradiation loops at FIG. 1*c* and FIG. 1*d*. Loops *a* and *c* were obtained when viewed in the direction of the hard axis of magnetization of the films, i.e., perpendicular to the easy axis, and loops *b* and *d* when viewed in the direction of the easy axis of magnetization of the films. Observation of the loops in the direction of the hard axis of the film showed a smaller loop opening in the post-irradiation loop *c* than in the pre-irradiation loop *a*, indicating a decrease in the coercive force $H_c$ of the film on irradiation in the magnetic field. Observation in the direction of the easy axis of the film also showed a smaller loop opening, although to a much less degree, in the post-irradiation loop *d* than in the pre-irradiation loop *b*, again indicating a lower coercive force for the treated film.

Examples of the uniaxial anisotropy energy $K_u$ and the coercive force $H_c$ of the nickel-iron alloy films before and after irradiation are contained in the table below.

| Film thickness, Angstroms | $10^{-3} \times K_u$ (erg/cc.) | | Change in $K_u$ Percent | $H_c$ oersted | |
|---|---|---|---|---|---|
| | Before | After | | Before | After |
| 6,000 | 1.40 | 4.18 | +199 | 1.8 | 1.6 |
| 5,700 | 1.47 | 4.26 | +189 | 1.7 | 1.5 |

The method of the invention, as has been demonstrated above, is effective to increase the uniaxial anisotropy energy of thin ferromagnetic films and enhance the axial orientation of the preferred or easy axis of magnetization of the films. It is also effective to reduce the coercive force for the films and thereby lower the energy requirement of a saturation magnetic field for the films.

In U.S. Patent 3,113,055 to Schindler and Salkovitz, a method is described for treating ferromagnetic materials in the bulk by neutron bombardment in a saturating magnetic field. The bulk materials so treated exhibit an increase in the coercive force in contrast to a reduction in this property for ferromagnetic films which are treated by the method of this invention. A further advantage of the method of the present invention is that the irradiated thin ferromagnetic films exhibit a very low degree of radioactivity, in contrast to a relatively hot radiation condition for the irradiated bulk materials of the patent.

Figure 2:
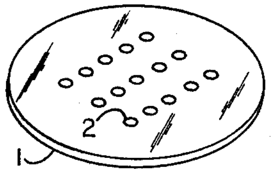

The method of the invention can be applied for the preparation of a memory array as shown in FIG. 2 of the drawing where the film is laid down on the smooth substrate surface 1, for example, of glass or quartz, in a rectangular pattern of circular thin ferromagnetic film spots 2, called bits. Treatment of the film spots by the method of the invention will cause the easy direction of magnetization of the spots or bits to be oriented parallel to the magnetic field applied during the irradiation.

While the invention has been described herein with reference to certain specific embodiments, it is to be understood that such are to be taken by way of illustration and not in limitation except as may be defined in the appended claim.

What is claimed and desired to be secured by Letters Patent of the United States is:

1. A method of treating a thin ferromagnetic film of an iron-nickel alloy to increase the uniaxial anisotropy energy and orient the easy axis of magnetization of the film which comprises subjecting the film in the presence of a saturating magnetic field applied parallel to a desired direction in the plane of the film and at a temperature of from about 15 to 100° C. to a beam of $He^3$ particles having a total integrated flux of about $9 \times 10^{16}$/cm.$^2$.

References Cited

UNITED STATES PATENTS 3,281,289 10/1966 Gordon et al. ........ 148—103

L. DEWAYNE RUTLEDGE, Primary Examiner

U.S. Cl. X.R.

117—62, 107